United States Patent
Sand et al.

(10) Patent No.: US 6,611,742 B1
(45) Date of Patent: Aug. 26, 2003

(54) AUTOMOBILE SECURITY ALARM SYSTEMS

(75) Inventors: Paul Raymond Sand, Woodridge, IL (US); Kenneth Ward, Naperville, IL (US); Jan Zheng, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/128,017

(22) Filed: Apr. 22, 2002

(51) Int. Cl.[7] .......................... B60R 25/00; G08B 25/10
(52) U.S. Cl. .................... 701/36; 701/213; 342/357.07; 340/825.36
(58) Field of Search .......................... 701/36, 35, 213; 342/357.07, 357.08, 357.09; 340/988, 991, 992, 993, 438, 426, 825.36, 825.69; 307/10.2–10.3, 10.6

(56) References Cited

U.S. PATENT DOCUMENTS

| | | | | |
|---|---|---|---|---|
| 5,528,248 A | * | 6/1996 | Steiner et al. | 342/357.06 |
| 5,796,178 A | * | 8/1998 | Onuma | 307/10.2 |
| 5,939,988 A | * | 8/1999 | Neyhart | 340/573.4 |
| 6,067,007 A | * | 5/2000 | Gioia | 340/426 |
| 6,101,428 A | * | 8/2000 | Snyder | 701/2 |
| 6,147,598 A | * | 11/2000 | Murphy et al. | 340/426 |
| 6,204,772 B1 | * | 3/2001 | DeMay et al. | 340/686.1 |
| 6,430,498 B1 | * | 8/2002 | Maruyama et al. | 701/200 |

* cited by examiner

Primary Examiner—Tan Q. Nguyen

(57) ABSTRACT

A method and apparatus for an automobile security system. A GPS Receiver is used to measure the location of an automobile, and after the user has left the car, to measure the location of the user. The location of the car when it is parked is recorded in the GPS Receiver System. When the user is more than a pre-determined distance from the car, as determined by a GPS location measurement that is compared with the stored GPS location, the security system is activated and the car is locked. Subsequently, when the user comes within a second pre-determined distance of the car, the security system is deactivated, and the car is unlocked. Advantageously, both the locking and unlocking is accomplished without forcing the user to perform any manual act. Advantageously, the user can get directions from the GPS Receiver to help locate the car.

12 Claims, 3 Drawing Sheets

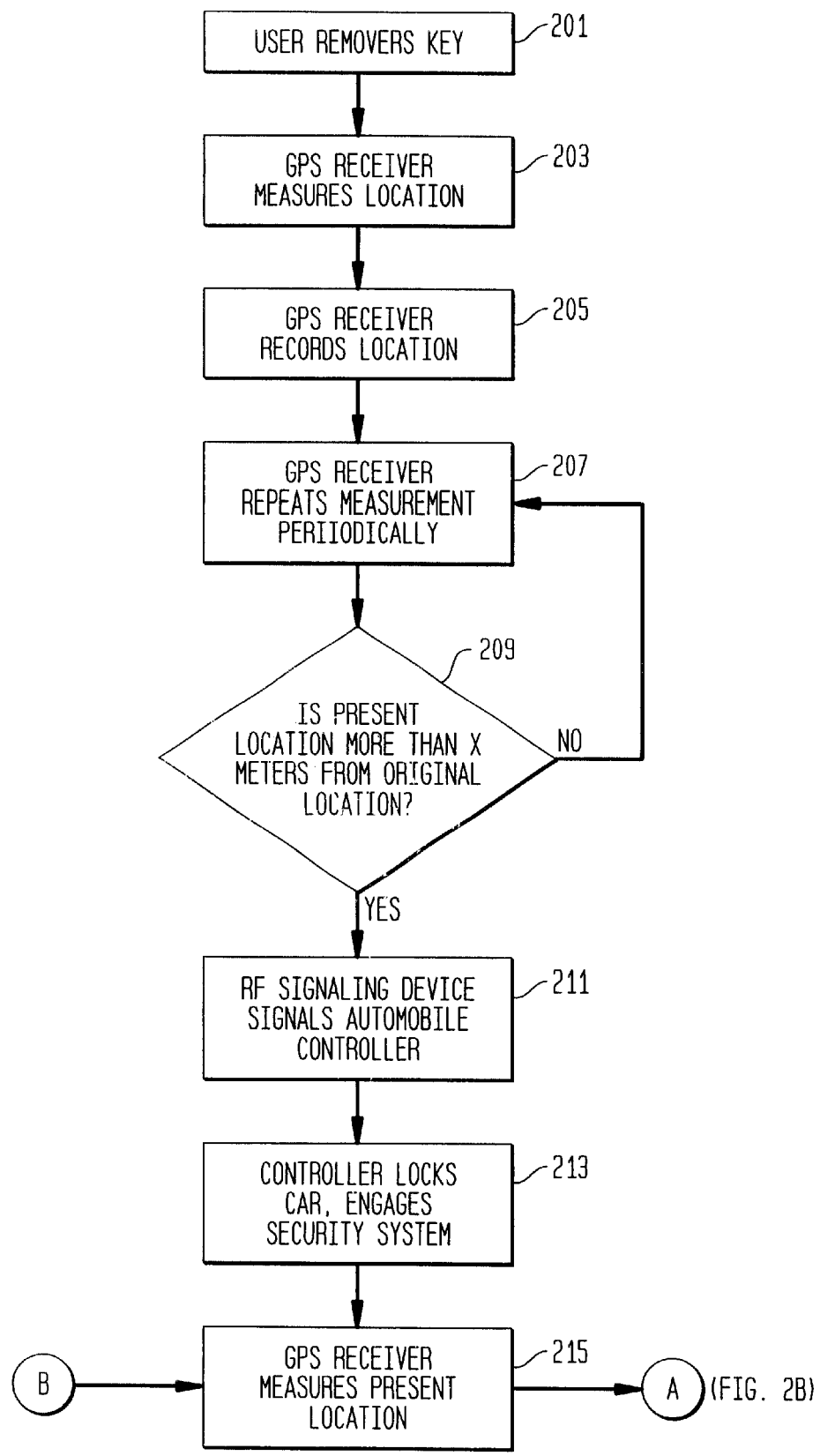

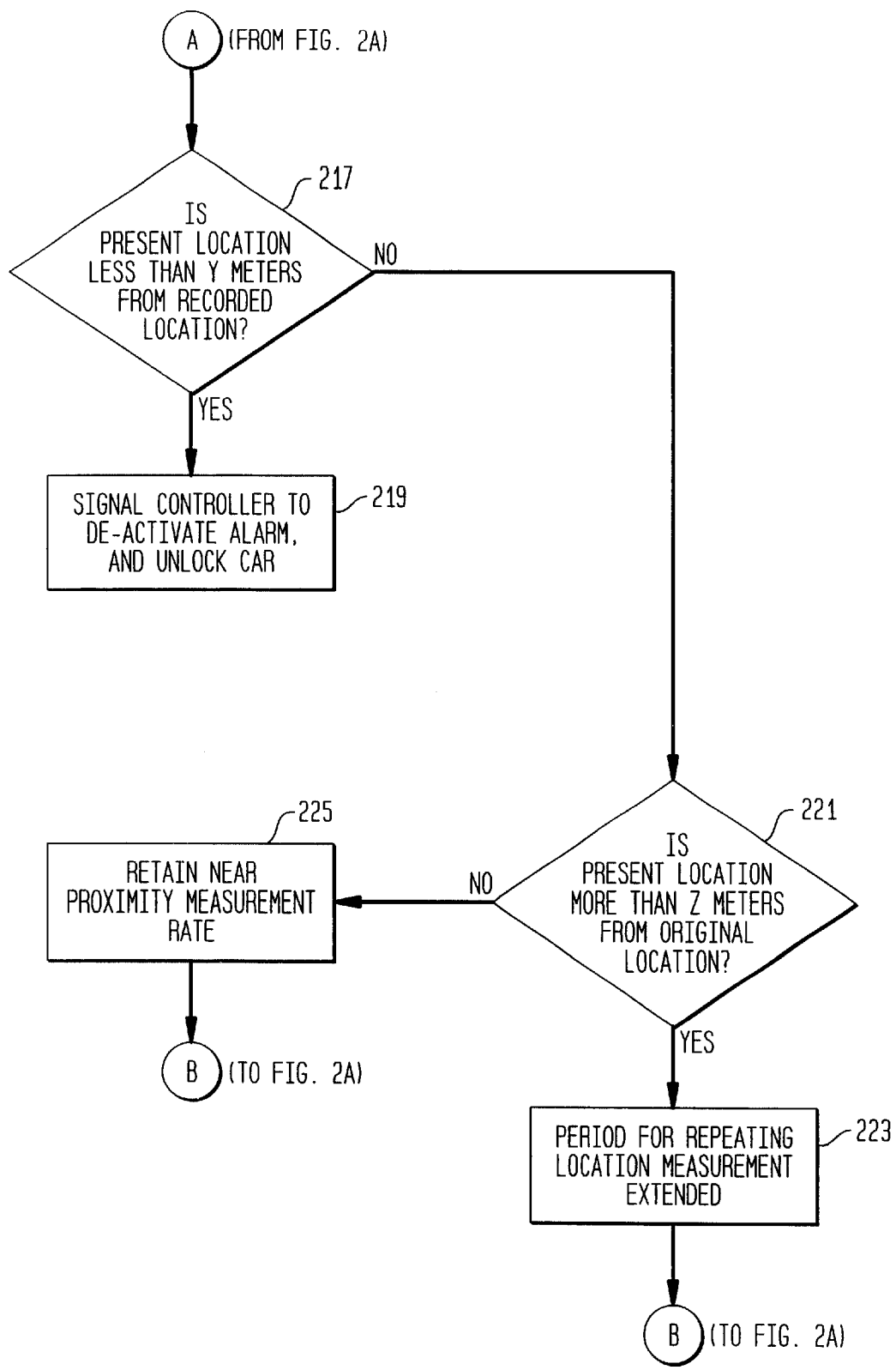

AUTOMOBILE SECURITY ALARM SYSTEMS

TECHNICAL FIELD

This invention relates to Automobile Security Alarm Systems.

PROBLEM

Automobile Security Alarm Systems are very popular. The typical security alarm system provides arrangements whereby the alarm system is activated, and if someone tries to enter an automobile while the alarm system is activated, an alarm goes off. The alarm systems are typically activated by either a combination of entering a number into a device, and then pushing a button on the device within a small interval of time prior to closing the car, or automatically activating the alarm system when the key is removed and the door is locked from the outside. A problem with the prior art is that these arrangements are clumsy and are difficult to implement when the driver or owner of the car has his/her hands full with groceries and/or children.

A feature of many of the alarm systems is that if the owner or user of the car presses an unlock button when that person is within a short distance of the car (typically, about 20 feet, although in some systems, allow for a distance of up to 100 feet), the lights on the car are turned on, the horn emits one or two tones, or both. This helps people who are close to the car find the car, and is especially useful in a crowded parking lot. A problem with this arrangement is that it is only useful if the owner of the car is already a relatively short distance away from the car.

SOLUTION

The above problems are solved and an advance is made over the teachings of the prior art in accordance with this invention, wherein a location system, such as a Global Positioning System (GPS), locates and records the present location of the car when a key is removed from the ignition; the location device is carried by the driver and periodically checks the present location of that driver; when the driver is more than a pre-determined distance from the car, as determined by the difference between the present location and the recorded location, the location device sends a signal to the car to activate the alarm system, and to lock the car if the car is not already locked. Subsequently, when the driver is looking for the car, the location device is activated and displays the difference between the present location of the driver and the recorded location of the car, thus giving the driver directions for how to get to the car.

In one preferred embodiment of the invention, the location device is activated and determines the distance between the driver and the car. When this distance is less than a pre-determined amount, the driver is informed and optionally, the alarm system is deactivated and lights on the car and/or a horn tone from the car is activated. Advantageously, this helps the driver to locate the car.

BRIEF DESCRIPTION OF THE DRAWING(S)

FIG. 2 is a flow diagram illustrating the operation of Applicant' invention.

DETAILED DESCRIPTION

Figure 1:
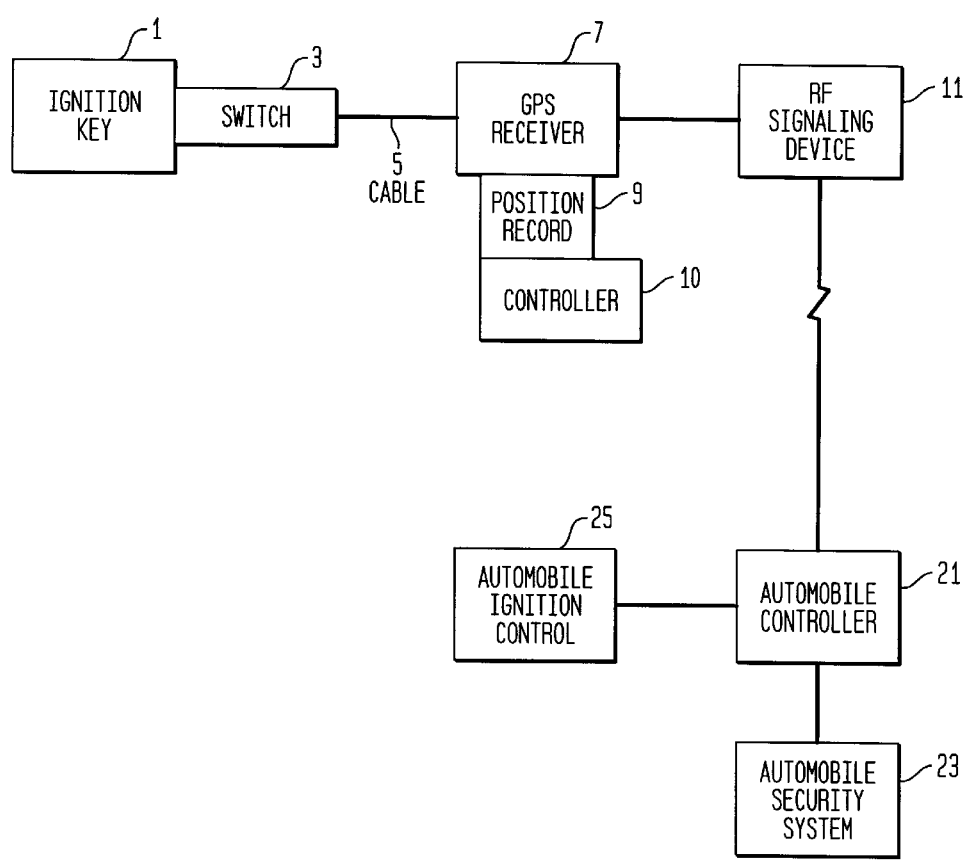
FIG. 1 is a block diagram showing the architecture of Applicant' invention.

FIG. 1 is a block diagram illustrating the architecture of Applicant' invention. An ignition key (1) contains a switch (3) which will be located in a channel of the ignition key, which switch is operated when the ignition key is withdrawn from the ignition. The key and switch are connected to a Global Positioning System (GPS) Receiver (7) by a cable (5). The GPS receiver is controlled by a program-controlled controller (10). When the switch is operated, a signal is sent through the cable which causes the GPS Receiver to take a location measurement, and to record the present position in Position Recording Device (9). Alternatively, as the car is turned off, a loss of an R F (Radio Frequency) signal coincident with the car being turned off, causes the current location to be recorded. When the user moves away from the automobile, the GPS Receiver repeatedly takes measurements of the present location, and compares this location with the location recorded in Position Record (9). When the distance between as present location and the original position recorded in Position Record (9) exceeds a predetermined value, the GPS Receiver commands an R F (Radio Frequency) Signaling Device (11) (similar to keyless entry signaling devices), which sends a signal to an automobile controller (21). In response to the signal, the automobile controller activates the automobile security system (23), and blocks out the ignition system (25). Subsequently, the GPS Receiver measures the location of the user from time to time, and when the user is within another pre-determined distance of the automobile, causes the RF Signaling Device to send an unlock signal to the automobile controller (21), which deactivates the security system (23), and re-activates the ignition control (25).

If at any time the user wishes to receive help in locating the car, the user can request the GPS Receiver to make a location measurement, and to display the difference between the present location of the user and the location of the car. This difference can be expressed as a distance in the north/south direction, a distance in the east/west direction, and a difference in elevation. More elaborate systems are, of course, available with GPS Receivers, which can provide detailed directions in terms of street directions.

FIG. 2 is a flow diagram illustrating the operation of Applicant' invention. A user at the end of a trip removes the ignition key, Action Block (201). The GPS Receiver measures the present location of the car, Action Block (203). This location is then recorded in position record (9), Action Block is (205). The GPS then repeats the location measurement periodically, Action Block (207). Test (209) is used to determine whether the user is carrying the GPS Receiver is more than X meters from the original location. If not, then Action Block (207) is re-entered, and the GPS Receiver repeats the measurement. If the present location is more than X meters from the original location, (as stored in the Location Record (9)), then the R F (Radio Frequency) Signaling Device signals the automobile controller, Action Block (211). The controller then locks the car, and engages the security system, Action Block (213). Subsequently, the GPS Receiver measures the present location, Action Block (215). Test (217) is used to determine whether the present location is less than Y meters from the car. If so, then the R F (Radio Frequency) Signaling Device sends a signal to the automobile controller to de-activate the alarm, and unlock the car, Action Block (219). If the present location is not less than Y meters from the car, then Test (221) is used to determine if the user (and the GPS Receiver), are more than Z meters from the car, Test (221). If the receiver is now more than Z meters from the car, then the period for repeating the location measurement is extended, Action Block (223). If the GPS receiver is not less than Z meters, then the present period for taking location measurements is retained, Action Block (225). Following Action Blocks (223) or (225), Action Block (215) to perform a measurement is re-entered.

Typical values for X, Y, and Z are 20 meters, 15 meters, and 100 meters. If the flow diagram of FIG. 2 is followed, X must be somewhat higher than Y to prevent the system from oscillating between activation and de-activation. Z then represents a zone such that once the user is outside that zone, the user will not be within Y meters of the car before the next location measurement is performed. The period between location measurements initially can be 5 seconds, and subsequently, when the user is far away from the car, can be 30 seconds.

It may be desirable to combine a GPS receiver with a cellular station, since a user typically takes a cellular station with him/her when leaving a car. Such a combination of a cellular station and GPS receiver is likely to become popular in the near future, for example, to help improve 911 service. Also, since the key is attached to the GPS receiver, this would mean that the user would have to take the cellular station along whenever he/she uses the car.

The GPS receiver and other apparatus can be used to guide the user back to the initial location of the automobile, using well-known arrangements from the prior art.

The above description is one preferred embodiment of Applicant' invention. Other embodiments will be apparent to those of ordinary skill in the art without departing from the scope of Applicant' invention. Applicant' invention is limited only by the attached claims.

We claim:

1. A method of controlling an automobile security alarm system, comprising the steps of:
   responsive to turning off the engine of the automobile, performing an initial location measurement;
   recording an initial location obtained from said initial location measurement;
   a user of said automobile leaving said automobile;
   performing a series of subsequent location measurements for determining a present location of a user of said automobile, said user carrying a location device having the record of said initial location measurement;
   if a difference between a present location of said user and said initial location exceeds a first pre-determined value, activating said security alarm system in said automobile.

2. The method of claim 1, wherein the step of performing an initial location measurement comprises the steps of:
   turning off an ignition system of said automobile;
   responsive to turning off said ignition system, turning off a radio-frequency signal; and
   performing said initial location measurement in response to absence of said radio frequency channel.

3. The method of claim 1, wherein the step of performing an initial location measurement comprises the step of performing said initial location measurement using a Global Positioning System (GPS) receiver.

4. The method of claim 1, wherein the step of performing a series of subsequent location measurements comprises the step of performing a periodic series of subsequent location measurements.

5. The method of claim 4, wherein a period of said periodic series of subsequent location measurements is increased if a distance between said initial location and a present location exceeds a second pre-determined value.

6. The method of claim 1, further comprising the step of:
   obtaining directions for moving from a present location to said initial location.

7. The method of claim 1, further comprising the step of:
   if a difference between a present location of said user and said initial location is less than a third pre-determined value, deactivating said security system.

8. The method of claim 7 wherein the step of deactivating said security system comprises the step of transmitting a Radio Frequency signal from a transmitter carried by said user.

9. Apparatus for controlling an automobile security alarm system comprising:
   a Global Positioning System (GPS) receiver; and
   means for recording a location measured by said GPS receiver;
   said apparatus carried by a user of the automobile when said user leaves said automobile;
   said apparatus further comprising control means for performing the following steps:
      responsive to receipt of an indication that the engine of said automobile has been turned off performing an initial location measurement;
      recording an initial location obtained from said initial location measurement in said means for recording a location;
      performing a series of subsequent location measurements for determining a present location of a user of said automobile;
      if a difference between a present location of said user and said initial location exceeds a first pre-determined value, activating said security alarm system in said automobile.

10. The apparatus of claim 9, further comprising:
    means responsive to detection that an ignition system of said automobile has been turned off for turning off a Radio Frequency signal; and
    means for detecting that said Radio Frequency signal is no longer present;
    wherein said controller is responsive to detection of an absence of said Radio Frequency signal for controlling the step of performing an initial location measurement.

11. The apparatus of claim 9, wherein said controller further controls the step of:
    if a difference between a present location of said user and said initial location is less than a second pre-determined value, deactivating said security system.

12. The apparatus of claim 9 wherein said controller further comprises means for turning on a Radio Frequency signal for deactivating said security alarm system if a difference between a present location of said user and said initial location is less than a second pre-determined value.

* * * * *